(12) United States Patent
Wu

(10) Patent No.: US 9,878,509 B2
(45) Date of Patent: Jan. 30, 2018

(54) SHOE MOLD STRUCTURE

(71) Applicant: Chia-Hung Wu, Taichung (TW)

(72) Inventor: Chia-Hung Wu, Taichung (TW)

( * ) Notice: Subject to any disclaimer, the term of this patent is extended or adjusted under 35 U.S.C. 154(b) by 256 days.

(21) Appl. No.: 15/000,512

(22) Filed: Jan. 19, 2016

(65) Prior Publication Data

US 2017/0203529 A1  Jul. 20, 2017

(51) Int. Cl.
*B29D 35/00* (2010.01)
*B29D 35/12* (2010.01)

(52) U.S. Cl.
CPC ....... *B29D 35/0036* (2013.01); *B29D 35/122* (2013.01); *B29D 35/126* (2013.01); *B29D 35/128* (2013.01)

(58) Field of Classification Search
CPC  B29D 35/0036; B29D 35/126; B29D 35/128; B29D 35/122; B29D 35/142; B29D 35/0054; B29D 35/148; B29D 35/0009; B29D 35/146; B29D 35/00; B29D 35/0018; B29D 35/0063; B29D 35/12; B29D 35/02; B29D 35/06; B29D 35/061; B29L 2031/504; B29L 2031/50; B29L 2031/505; B29L 2031/502; B29C 45/14467; B29C 45/0017; B29C 2045/0024; B29C 45/1671; A43D 8/00

USPC ....... 425/556, 589, 592, 593, 594; 12/146 B, 12/103, 142 P, 146 R
See application file for complete search history.

(56) References Cited

U.S. PATENT DOCUMENTS

| 1,994,278 A | * | 3/1935 | Prior | .................. B29D 35/0036 425/119 |
| 2007/0090575 A1 | * | 4/2007 | Chen | .................... A43B 1/0027 264/511 |
| 2008/0175942 A1 | * | 7/2008 | Chi-Jin | ................... B29C 44/10 425/4 C |
| 2016/0121521 A1 | * | 5/2016 | Wu | ....................... B29C 43/361 425/395 |

* cited by examiner

*Primary Examiner* — Matthew J Daniels
*Assistant Examiner* — Leith S Shafi

(57) ABSTRACT

A shoe mold structure contains: a base, a lower part, an upper part, a mold core, and two connecting rod assemblies. The base includes a movable space, and the lower part includes a lower cavity, a through orifice, and two guiding slots. The upper part includes an upper cavity and at least one feeding orifice, and a connecting face of the upper part and the lower part flushes with a connection section of a body and a sole of a shoe. The mold core includes a molding portion, an extension, a holding plate, and two guide plates, wherein the extension extends to the movable space from the molding portion via the through orifice. Each connecting rod assembly couples with each of the two side surfaces of the upper part and said each guide plate.

9 Claims, 10 Drawing Sheets

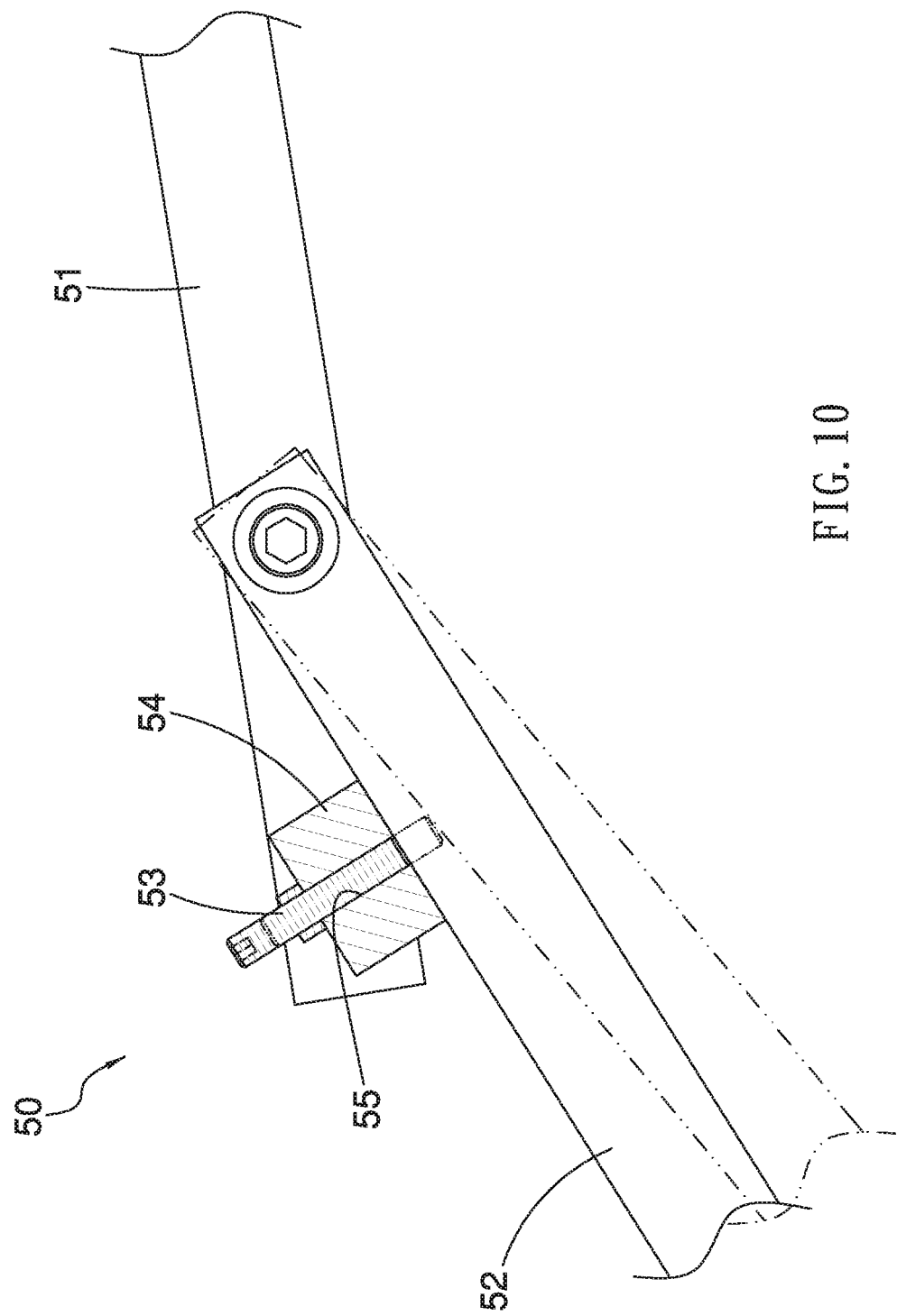

SHOE MOLD STRUCTURE

FIELD OF THE INVENTION

The present invention relates to a shoe mold structure which molds and removes a shoe easily.

BACKGROUND OF THE INVENTION

A conventional shoe mold structure is disclosed in TW M494076 and contains a vertical moving device so as to move a molding portion of a mold core into a lower cavity, such that the molding portion corresponds to a body of a shoe molded by the lower cavity in an injection molding process and corresponds to a sole of the shoe molded by an upper cavity, wherein a connection face of the upper mold and the lower mold flushes with a connection section of the body and the sole of the shoe.

However, after cooling the injection molding material, the upper mold is rotated upward, and a control lever of the vertical moving device is rotated downward so that the molding portion of the mold core and the shoe are upward pushed out of the lower cavity, thus causing a troublesome removal of the shoe from the molding portion. In addition, the mold core cannot be fixed after being pushing upward so that a fixing bolt is provided in the vertical moving device so as to fix the control lever, thus having complicated structure.

The present invention has arisen to mitigate and/or obviate the afore-described disadvantages.

SUMMARY OF THE INVENTION

The primary objective of the present invention is to provide a shoe mold structure in which the molding portion of the mold core moves into the lower cavity so that the body of the shoe is molded by way of the molding portion and the lower cavity, and the sole of the shoe is molded by means of the molding portion and the upper cavity.

Another objective of the present invention is to provide a shoe mold structure which removes the shoe from the molding portion of the mold core easily.

To obtain the above objectives, a shoe mold structure provided by the present invention contains: a base, a lower part, an upper part, a mold core, and two connecting rod assemblies.

The base includes a movable space.

The lower part is disposed on the base and includes a lower cavity and a through orifice, wherein a profile of the lower cavity corresponds to a body of a shoe, and the through orifice is defined in a bottom of the lower cavity and communicates with the movable space, the lower part includes two guiding slots formed on two side surfaces thereof, respectively.

The upper part is rotatably connected with a rear side surface of the lower part and includes an upper cavity defined on a bottom thereof, wherein a profile of the upper cavity corresponds to a sole of the shoe, the upper cavity has at least one feeding orifice communicating with a top of the upper part, and a connecting face of the upper part and the lower part flushes with a connection section of a body and a sole of a shoe.

The mold core includes a molding portion, an extension, a holding plate, and two guide plates, the molding portion is mounted in the lower part and corresponds to the body molded by the lower cavity and corresponds to the sole molded by the upper cavity, wherein the extension extends to the movable space from the molding portion via the through orifice, the holding plate moves upward and downward in the movable space and its top connects with a bottom of the extension, and the two guide plates are in connection with two side surfaces of the holding plate respectively.

Each connecting rod assembly couples with each of the two side surfaces of the upper part and said each guide plate, wherein the upper part is rotated upward or downward to drive the two connecting rod assemblies to push the two holding plates upward or downward, and the molding portion of the mold core is driven by the two holding plates to extends out of the upper cavity or to move into the lower cavity.

BRIEF DESCRIPTION OF THE DRAWINGS

FIG. 10 is a cross sectional view showing the operation of a part of the shoe mold structure according to the preferred embodiment of the present invention.

DETAILED DESCRIPTION OF THE PREFERRED EMBODIMENTS

Figure 1:
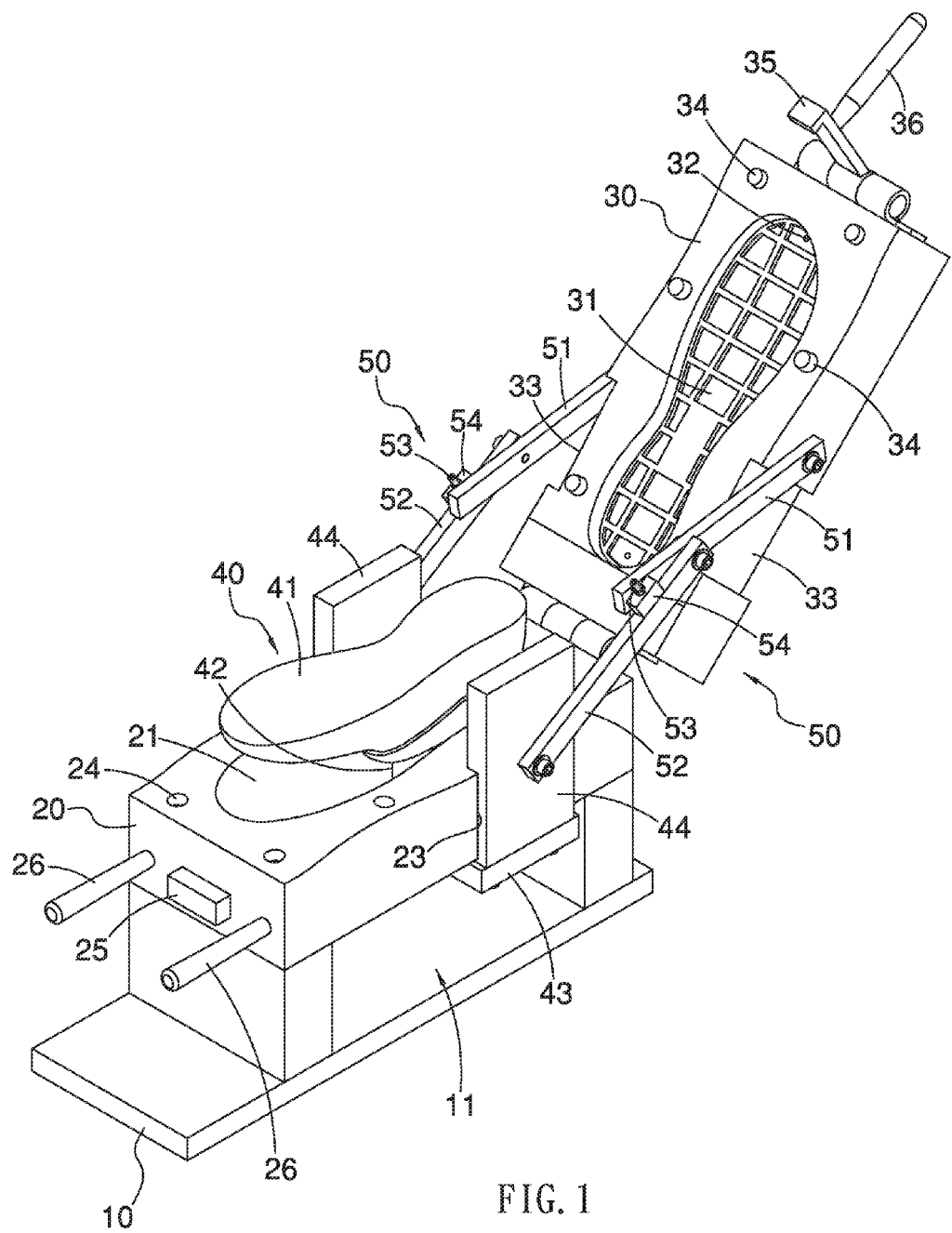
FIG. 1 is a perspective view showing the assembly of a shoe mold structure according to a preferred embodiment of the present invention.
Figure 2:
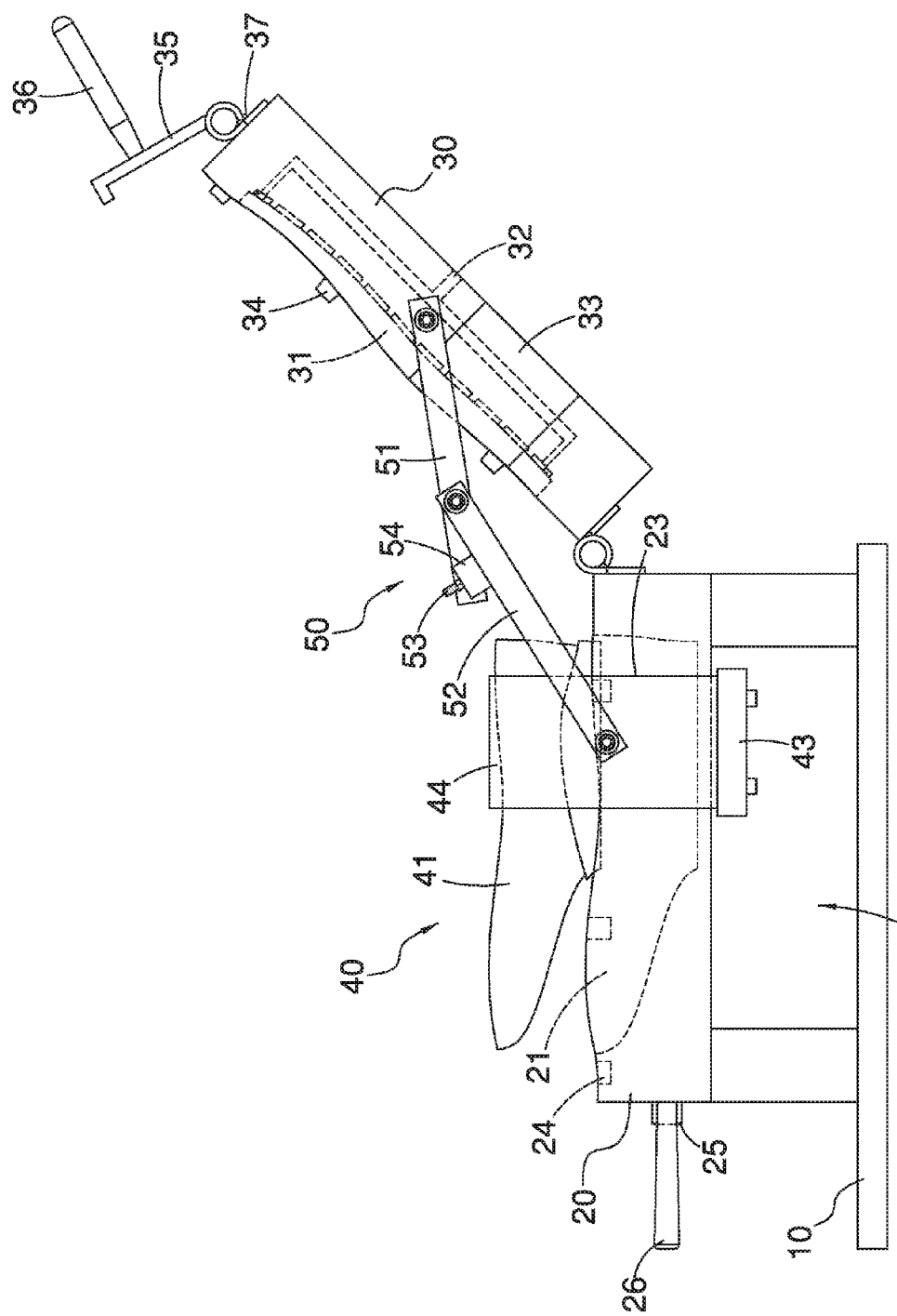
FIG. 2 is a side plan view showing the operation of the shoe mold structure according to the preferred embodiment of the present invention.
Figure 3:
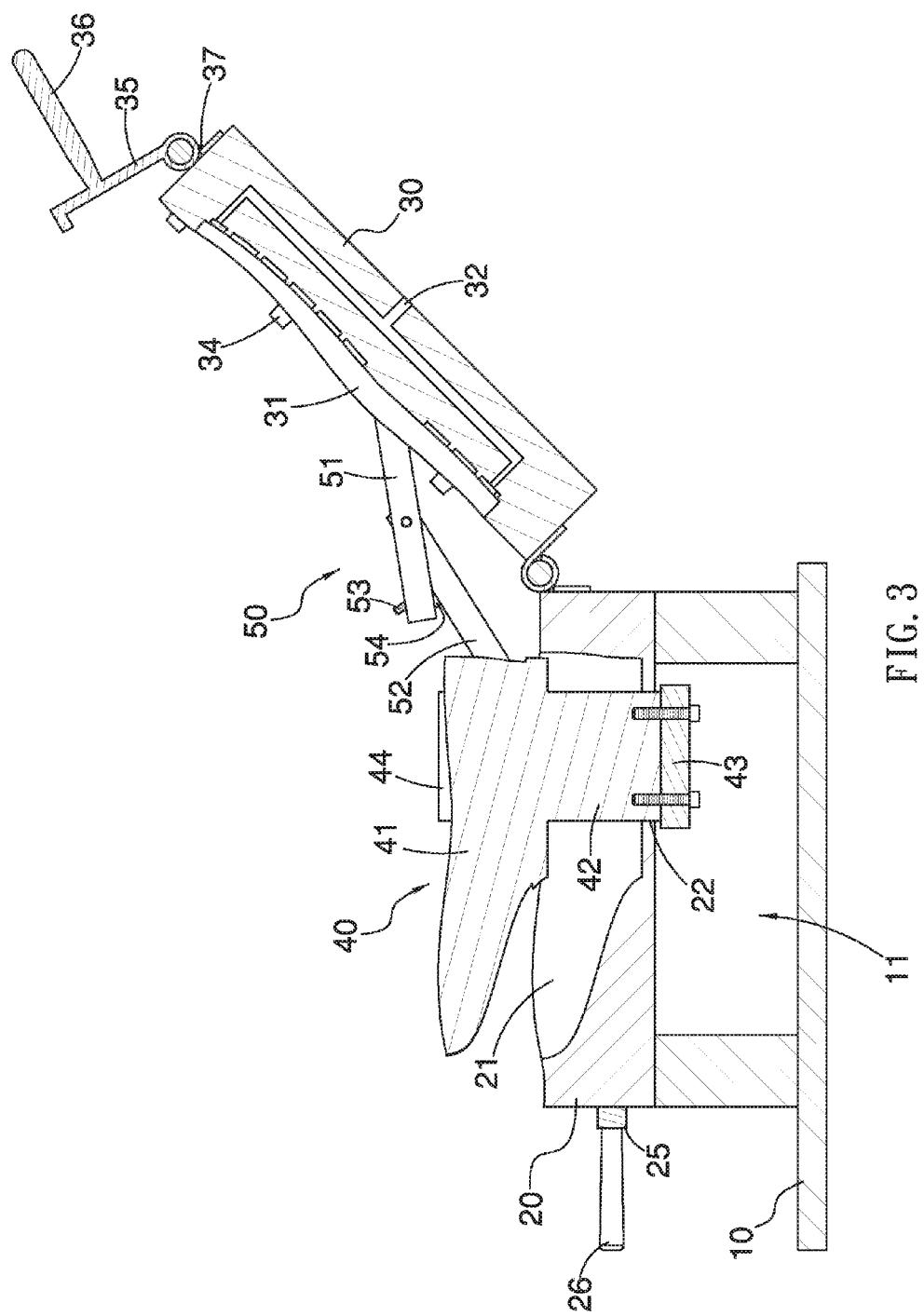
FIG. 3 is a cross sectional view showing the operation of the shoe mold structure according to the preferred embodiment of the present invention.

With reference to FIGS. 1 to 3, a shoe mold structure according to a preferred embodiment of the present invention comprises: a base 10, a lower part 20, an upper part 30, a mold core 40, and two connecting rod assemblies 50.

The base 10 including a movable space 11.

The lower part 20 is disposed on the base 10 and includes a lower cavity 21 and a through orifice 22, wherein a profile of the lower cavity 21 corresponds to a body of a shoe, and the through orifice 22 is defined in a bottom of the lower cavity 21 and communicates with the movable space 11. The lower part 20 includes two guiding slots 23 formed on two side surfaces thereof, respectively. The lower part 20 also includes a plurality of fixing notches 24 formed on a top thereof, a retainer 25 arranged on a front side surface thereof, and two handles 26 extending outwardly from the front side surface thereof adjacent to two sides of the retainer 25, respectively.

The upper part 30 is rotatably connected with a rear side surface of the lower part 20 by using a hinge, such that the upper part 30 is rotated upward relative to the lower part 20. The upper part 30 includes an upper cavity 31 defined on a bottom thereof, and a profile of the upper cavity 31 corresponds to a sole of the shoe. The upper cavity 31 has at least one feeding orifice 32 communicating with a top of the upper part 30 so as to feed injection molding material. The upper part 30 also includes two trenches 33 formed on two side surfaces thereof, respectively, wherein the two trenches 33 correspond to the two guiding slots 23 respectively, and a size of each of the two guiding slots 23 is greater than each of the two trenches 33. The upper part 30 further includes a plurality of conical positioning posts 34 extending outward from the bottom thereof and retaining into the plurality of fixing notches 24, respectively, thus fixing the upper part 30 and the lower part in an injection molding process. The upper part 30 also includes a fastener 35 arranged on a front side surface thereof so as to retain with the retainer 25, thus fixing the upper part 30 and the lower part 20 in the injection molding process. The fastener 35 has a control lever 36 and has a projection 37 arranged on a root of the fastener 35 so as to limit a rotation of the fastener 35 within a fixed angle.

The mold core 40 including a molding portion 41, an extension 42, a holding plate 43, and two guide plates 44. The molding portion 41 is mounted in the lower part 20 and corresponds to the body e molded by the lower cavity 21 and corresponds to the sole molded by the upper cavity 31. The extension 42 extends to the movable space 11 from the molding portion 41 via the through orifice 22. The holding plate 43 moves upward and downward in the movable space 11 and its top connects with a bottom of the extension 42. The two guide plates 44 are in connection with two side surfaces of the holding plate 43 respectively, and each guide plate 44 is formed in a C shape and retains in said each guiding slot 23 and moves upward and downward along each of the two side surfaces of the lower part 20. In addition, a connecting face of the upper part 30 and the lower part 20 flushes with a connection section of the body and the sole of the shoe.

Each connecting rod assembly 50 couples with each of the two side surfaces of the upper part 30 and said each guide plate 44, and said each connecting rod assembly 50 includes a driving shaft 51, a driven shaft 52, and an adjustable bolt 53. An upper end of the driving shaft 51 is rotatably connected with said each side surface of the upper part 30, and the driving shaft 51 has a protrusion 54 formed on a lower end thereof and has a threaded hole 55 defined on the protrusion 54, as shown in FIG. 10. A lower end of the driven shaft 52 is rotatably coupled with said each guide plate 44, and an upper end of the driven shaft 52 is rotatably connected with the driving shaft 51. The adjustable bolt 53 is screwed with the threaded hole 55 of the protrusion 54 and abuts against the driven shaft 52. When the upper part 30 is rotated upward toward a first angle (about 80 to 90 degrees) relative to the upper part 20, an angle defines between the driving shaft 51 and the driven shaft 52 of said each connecting rod assembly 50 so that the protrusion 54 retains with a top of the driven shaft 52, and when the upper part 30 is rotated upward continuously, the protrusion 54 of the driven shaft 51 of said connecting rod assembly 50 drives the driven shaft 52 to pull said each guide plate 44 upward until a second angle (around 130 to 140 degrees) forms between the upper part 30 and the lower part 20.

Figure 4:
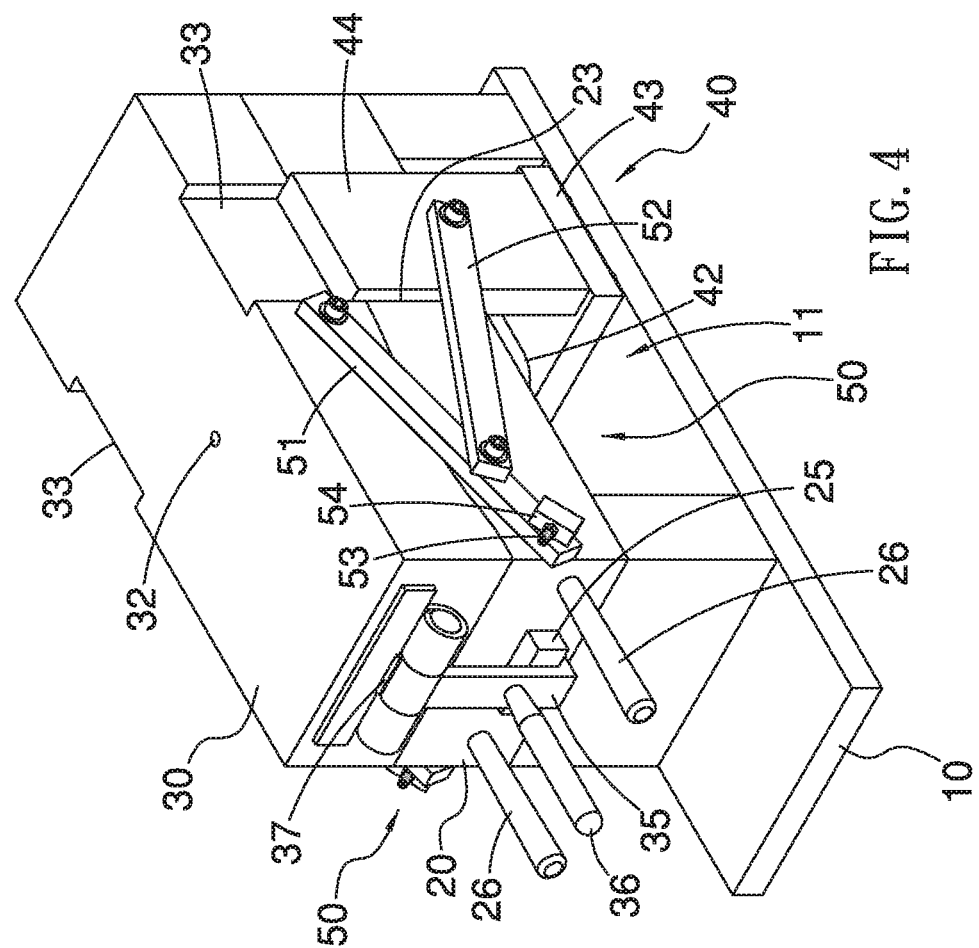
FIG. 4 is a perspective view showing the operation of the shoe mold structure according to the preferred embodiment of the present invention.
Figure 5:
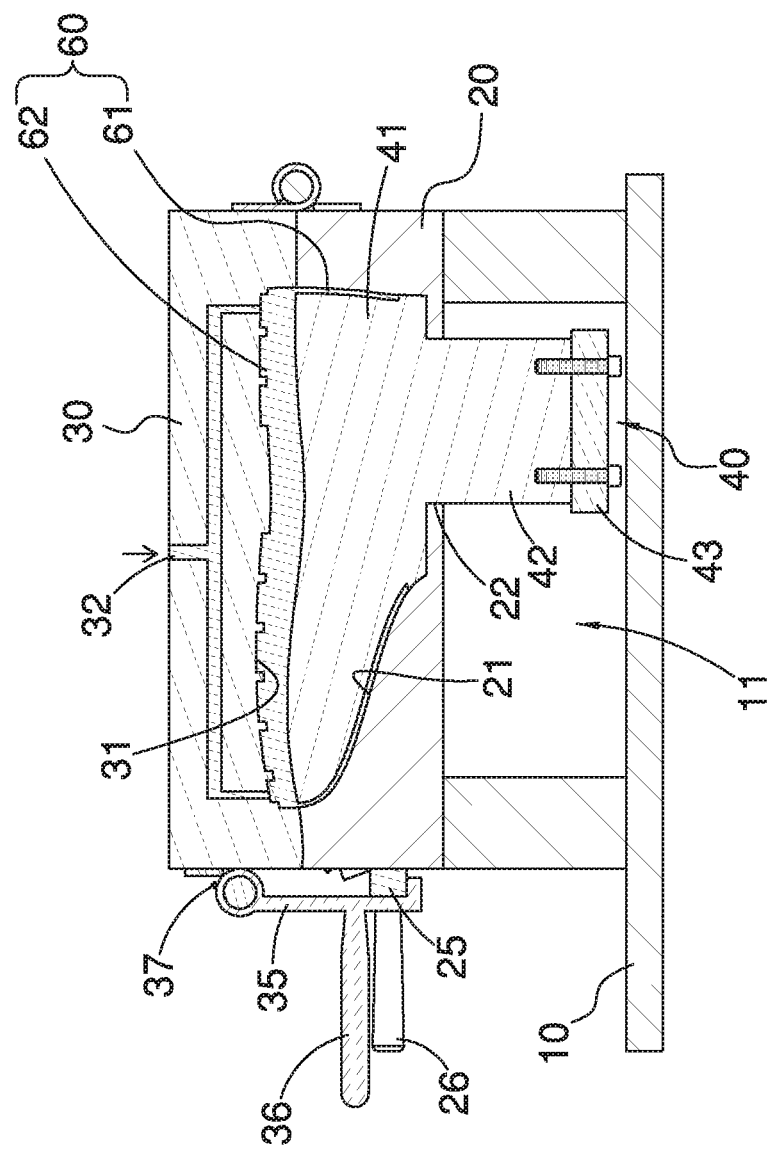
FIG. 5 is another cross sectional view showing the operation of the shoe mold structure according to the preferred embodiment of the present invention.

Referring to FIGS. 4 and 5, when the upper part 30 covers on the lower part 20, the two connecting rod assemblies 50 drive the molding portion 41 of the mold core 40 to move downward into the lower cavity 21, and the fastener 35 retains with the protrusion 54 so that the injection molding material is fed into the shoe mold structure from the at least one feeding orifice 32, hence the body 61 of the shoe 60 molds between the molding portion 41 of the mold core 40 and the lower cavity 21 of the lower part 20 and molds the sole 62 of the shoe 60 between the molding portion 41 of the mold core 40 and the upper cavity 31 of the upper part 30.

Figure 6:
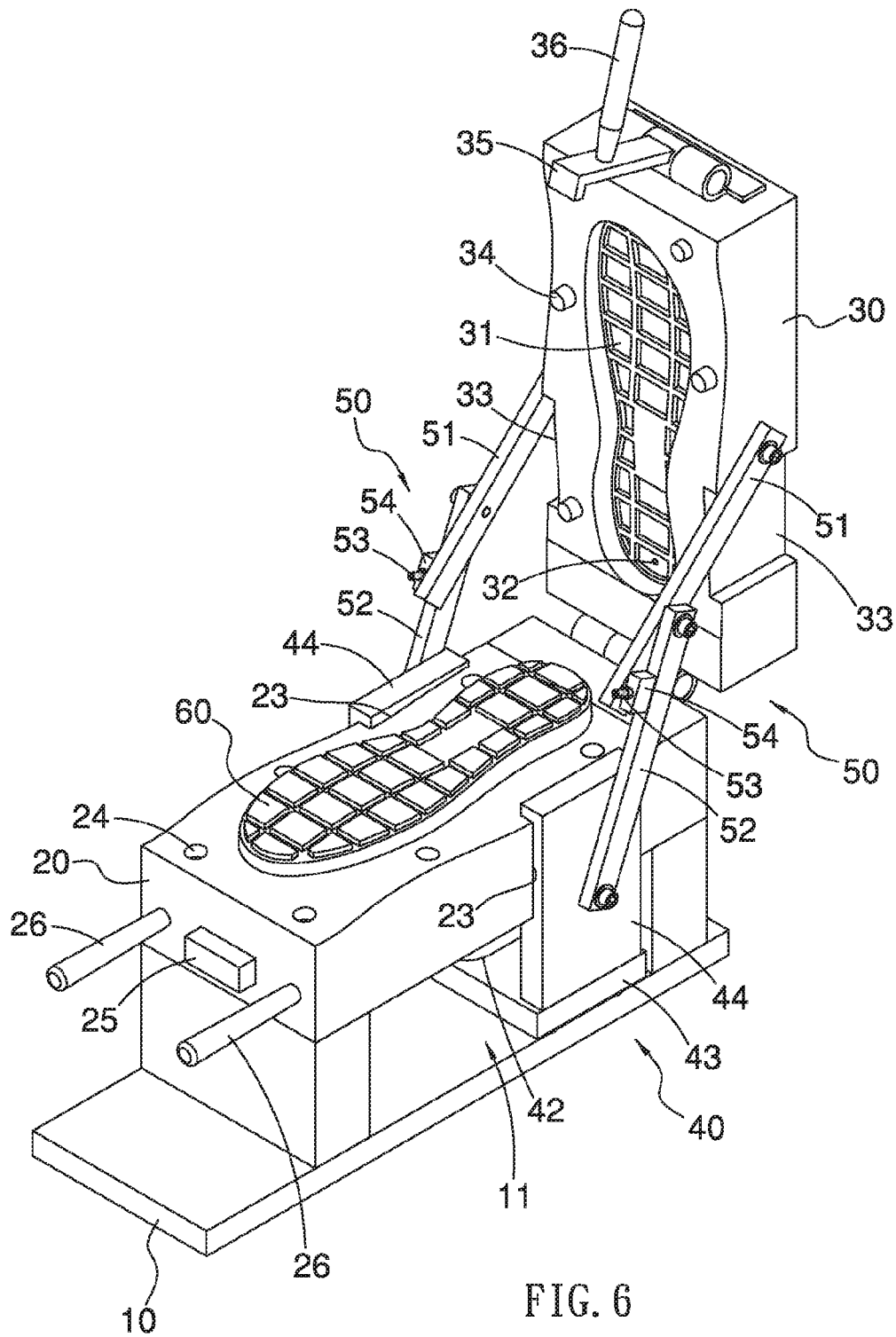
FIG. 6 is another perspective view showing the operation of the shoe mold structure according to the preferred embodiment of the present invention.
Figure 7:
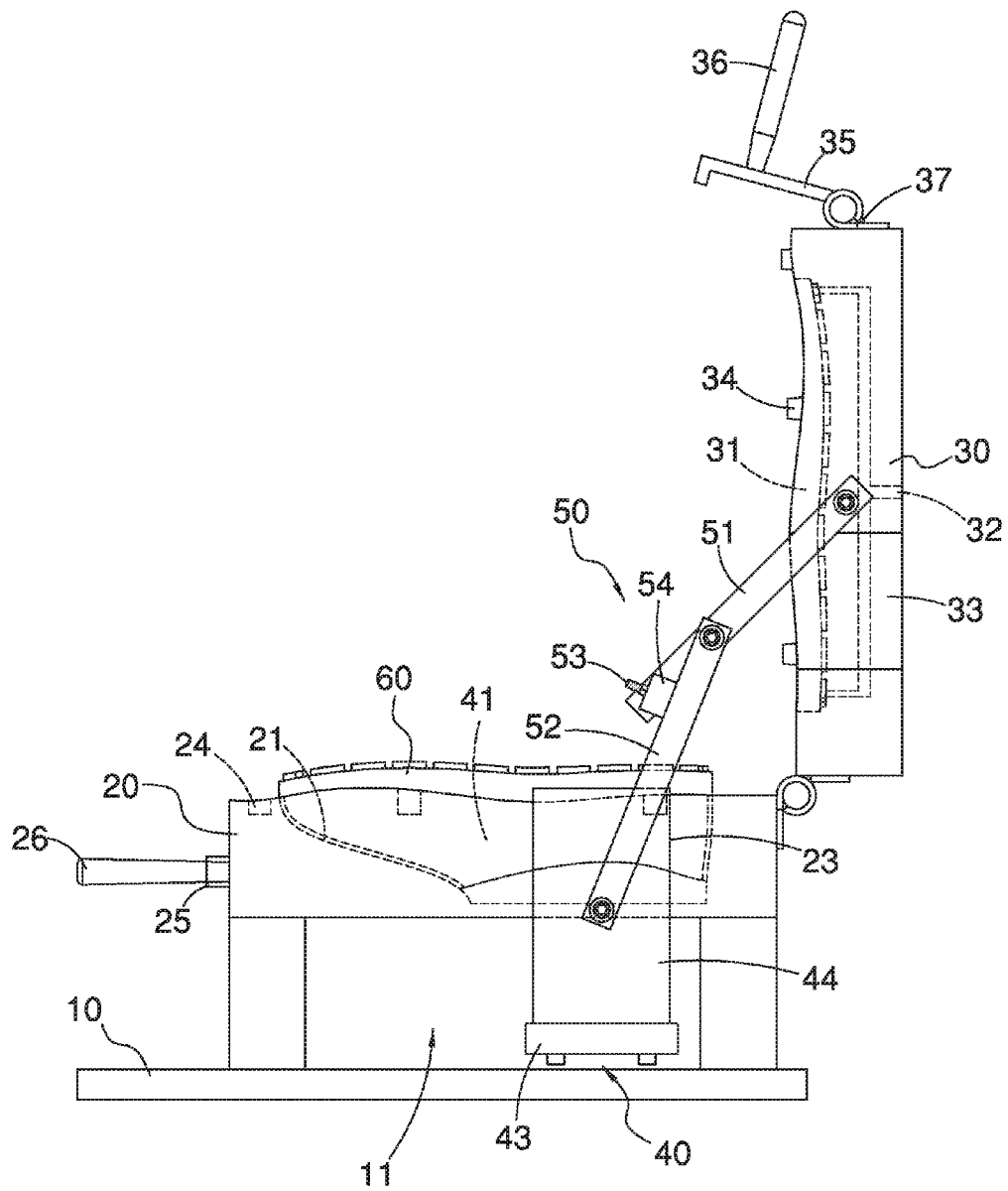
FIG. 7 is another side plan view showing the operation of the shoe mold structure according to the preferred embodiment of the present invention.

As shown in FIGS. 6 and 7, after the injection molding material in the upper part 31 and the lower part 21 cools, the handle 36 is pulled upward to remove the fastener 35 from the retainer 25 until the projection 37 limits the fastener 35, thereafter the fastener 35 drives the upper part 30 to rotate upward toward the first angle (about 80 to 90 degrees) relative to the lower part 20. In the meantime, the driving shaft 51 and the driven shaft 52 of said each connecting rod assembly 50 are driven by the upper part 30 to rotate toward the angle, thus the protrusion 54 retains with the driven shaft 52.

Figure 8:
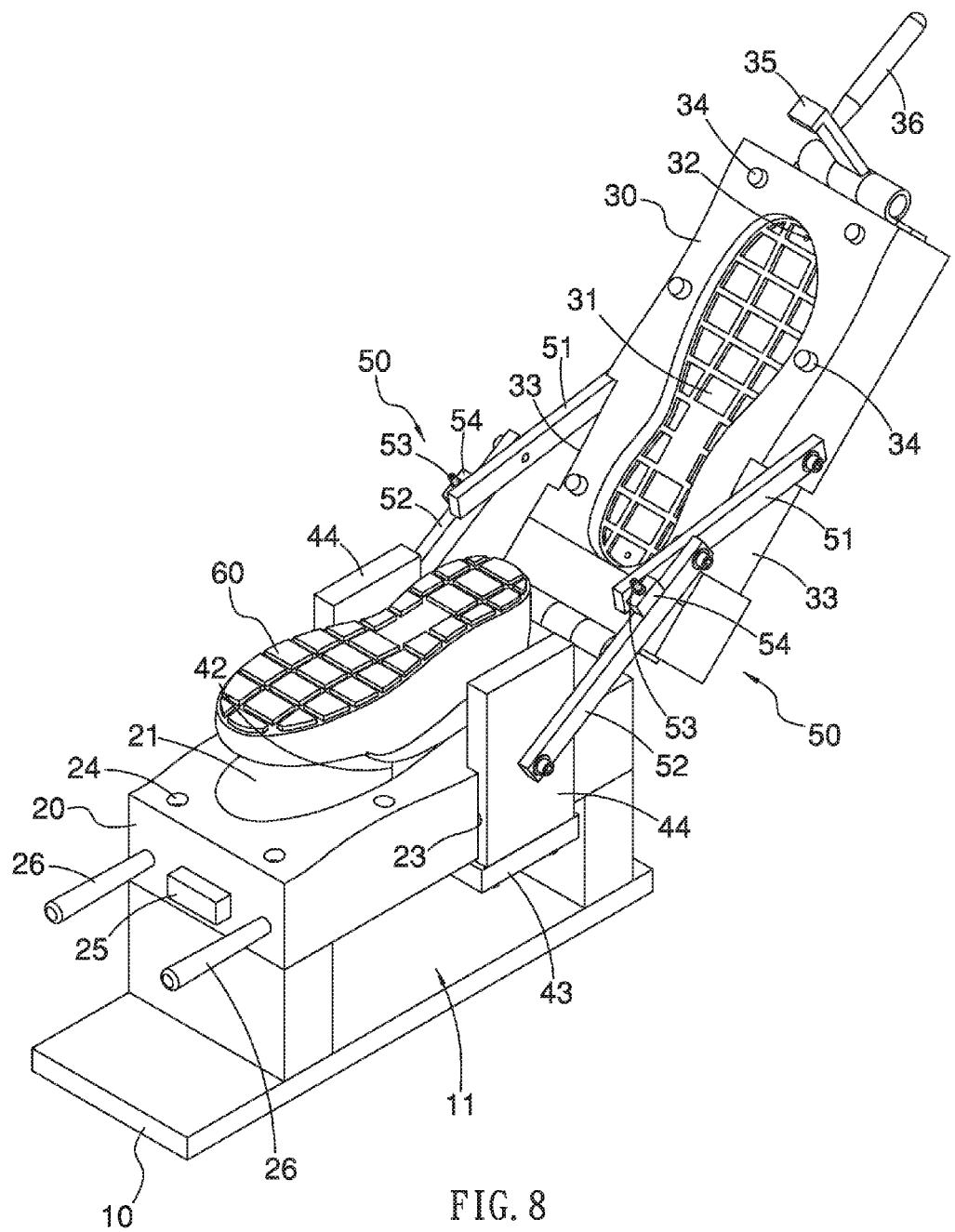
FIG. 8 is also another perspective view showing the operation of the shoe mold structure according to the preferred embodiment of the present invention.
Figure 9:
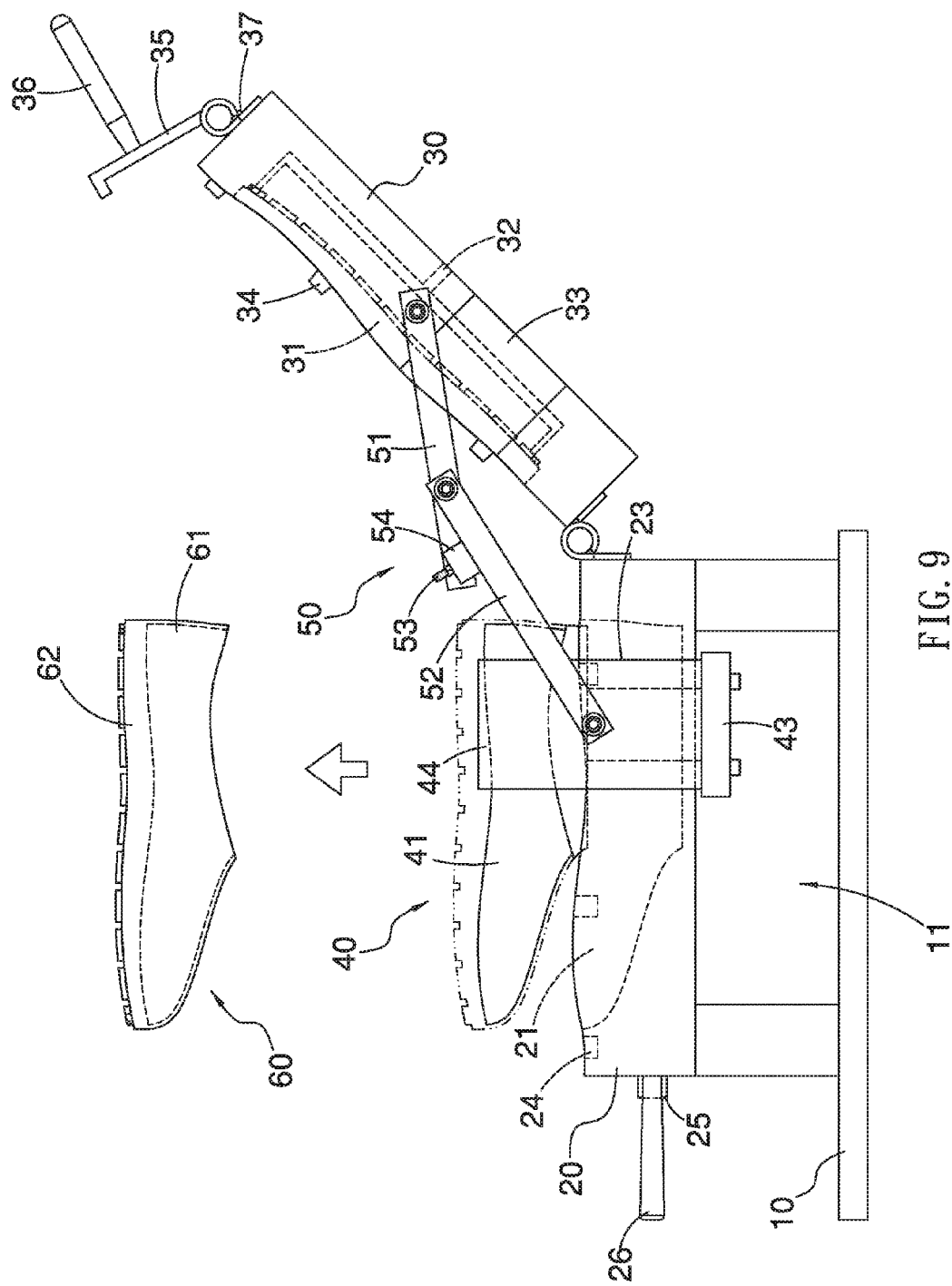
FIG. 9 is also another side plan view showing the operation of the shoe mold structure according to the preferred embodiment of the present invention.

As illustrated in FIGS. 8 and 9, when the handle 36 is pulled upward to rotate the upper part 30 upward toward the second angle (around 130 to 140 degrees) relative to the lower part 20, the protrusion 54 of the driving shaft 51 of said each connecting rod assembly 50 drives the driven shaft 25 to pull said each guide plate 44, hence the holding plate 43 drives the molding portion 41 of the mold core 40 and the shoe 60 to be pushed out of the lower cavity 21 by the driven shaft 52, and the shoe 60 is removed from the molding portion 41 of the mold core 40.

With reference to FIG. 10, the adjustable bolt 53 is rotated to extend out of the protrusion 54 and to contact with the driven shaft 52 so as to adjust the angle between the driving shaft 51 and the driven shaft 52, this adjusting a height of the mold core 40.

Thereby, the molding portion 41 of the mold core 40 moves into the lower cavity 21 so that the body 61 of the shoe 60 is molded by way of the molding portion 41 and the lower cavity 21, and the sole 60 of the shoe 60 is molded by means of the molding portion 41 and the upper cavity 31. Preferably, the body 61 and the sole 62 of the shoe 60 are molded from different materials and at different colors. The shoe 60 extends out of the lower cavity 21 for easy removal from the molding portion 41 of the mold core 40.

As rotating the upper part 30 upward, the mold core 40 is driven to move upward by way of the two connecting rod assemblies 50 so as to remove the shoe 60 from the molding portion 41 of the mold core 40 easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A shoe mold structure comprising:
   a base including a movable space;
   a lower part disposed on the base and including a lower cavity and a through orifice, wherein a profile of the lower cavity corresponds to a body of a shoe, and the through orifice is defined in a bottom of the lower cavity and communicates with the movable space, the lower part includes two guiding slots formed on two side surfaces thereof, respectively;

an upper part rotatably connected with a rear side surface of the lower part and including an upper cavity defined on a bottom thereof, wherein a profile of the upper cavity corresponds to a sole of the shoe, the upper cavity has at least one feeding orifice communicating with a top of the upper part, and a connecting face of the upper part and the lower part flushes with a connection section of a body and a sole of a shoe;

a mold core including a molding portion, an extension, a holding plate, and two guide plates, the molding portion being mounted in the lower part and corresponding to the body molded by the lower cavity and corresponding to the sole molded by the upper cavity, wherein the extension extends to the movable space from the molding portion via the through orifice, the holding plate moves upward and downward in the movable space and its top connects with a bottom of the extension, and the two guide plates are in connection with two side surfaces of the holding plate respectively;

two connecting rod assemblies, each connecting rod assembly coupling with each of the two side surfaces of the upper part and said each guide plate, wherein when the upper part is rotated upward or downward to drive the two connecting rod assemblies to push the two guide plates upward or downward, and the molding portion of the mold core is driven by the two guide plates to extend out of the upper cavity or to move into the lower cavity.

2. The shoe mold structure as claimed in claim 1, wherein said each connecting rod assembly includes a driving shaft and a driven shaft, an upper end of the driving shaft is rotatably connected with said each side surface of the upper part, and the driving shaft has a protrusion formed on a lower end thereof, a lower end of the driven shaft is rotatably coupled with said each guide plate, and an upper end of the driven shaft is rotatably connected with the driving shaft, when the upper part is rotated upward toward a first angle relative to the upper part, the protrusion retains with a top of the driven shaft, and when the upper part is rotated upward continuously, the protrusion of the driven shaft of said connecting rod assembly drives the driven shaft to pull said each guide plate upward until a second angle forms between the upper part and the lower part.

3. The shoe mold structure as claimed in claim 2, wherein said each connecting rod assembly further includes an adjustable bolt, the driving shaft has a threaded hole defined on the protrusion, the adjustable bolt screws with the threaded hole and abuts against the driven shaft so as to control an angle between the driving shaft and the driven shaft and to adjust a height of the mold core.

4. The shoe mold structure as claimed in claim 2, wherein the second angle is more than 90 degrees.

5. The shoe mold structure as claimed in claim 2, wherein the upper part also includes two trenches formed on two side surfaces thereof respectively and corresponding to the two guiding slots respectively.

6. The shoe mold structure as claimed in claim 2, wherein the lower part also includes a plurality of fixing notches formed on a top thereof, and the upper part further includes a plurality of conical positioning posts extending outward from the bottom thereof and retaining into the plurality of fixing notches, respectively, thus fixing the upper part and the lower part in an injection molding process.

7. The shoe mold structure as claimed in claim 2, wherein the lower part further includes a retainer arranged on a front side surface thereof and includes two handles extending outwardly from the front side surface thereof adjacent to two sides of the retainer, respectively, the upper part also includes a fastener arranged on a front side surface thereof so as to retain with the retainer.

8. The shoe mold structure as claimed in claim 7, wherein the fastener has a control lever and has a projection arranged on a root of the fastener so as to limit a rotation of the fastener within a fixed angle.

9. The shoe mold structure as claimed in claim 2, wherein each guide plate is formed in a C shape and retains in said each guiding slot and moves upward and downward along each of the two side surfaces of the lower part.

* * * * *